US010621437B2

(12) United States Patent
Ren

(10) Patent No.: US 10,621,437 B2
(45) Date of Patent: Apr. 14, 2020

(54) METHOD, APPARATUS FOR CONTROLLING A SMART DEVICE AND COMPUTER STORGE MEDIUM

(71) Applicant: BEIJING XIAOMI MOBILE SOFTWARE CO., LTD., Beijing (CN)

(72) Inventor: Qiao Ren, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/926,788

(22) Filed: Mar. 20, 2018

(65) Prior Publication Data
US 2018/0276474 A1 Sep. 27, 2018

(30) Foreign Application Priority Data

Mar. 21, 2017 (CN) .......................... 2017 1 0169381

(51) Int. Cl.
*G06F 17/00* (2019.01)
*G06K 9/00* (2006.01)
(Continued)

(52) U.S. Cl.
CPC ....... *G06K 9/00671* (2013.01); *G06F 3/0482* (2013.01); *G06F 3/0484* (2013.01);
(Continued)

(58) Field of Classification Search
CPC ... G06K 9/0067; G06F 3/0482; G06F 3/0484; G06F 3/0488
(Continued)

(56) References Cited

U.S. PATENT DOCUMENTS 9,449,229 B1 * 9/2016 Laska ................ G06K 9/00765
9,501,915 B1 * 11/2016 Laska .................... H04N 7/181
(Continued)

FOREIGN PATENT DOCUMENTS

CN 104597759 A 5/2015
CN 105425954 A 3/2016
(Continued)

OTHER PUBLICATIONS

Rodriguez et al., Footstep Recognition for a Smart Home Environment, Google Scholar 2008, pp. 95-110. (Year: 2008).*
(Continued)

*Primary Examiner* — Cong-Lac Huynh
(74) *Attorney, Agent, or Firm* — Oblon, McClelland, Maier & Neustadt, L.L.P.

(57) ABSTRACT

The disclosure relates to a method for controlling a smart device, an apparatus, and non-transitory computer-readable medium. The method includes acquiring a video stream captured by a smart camera that is bound to the user account, wherein the video stream includes multi-frame video that includes a plurality of one-frame video images; performing pattern recognition on each of the plurality of one-frame video images, wherein the pattern recognition is configured to determine an area that includes at least one smart device in at least one of the plurality of one-frame video images; determining, based on the pattern recognition, a target area that includes the smart device in a first one-frame video image of the plurality of one-frame video images; displaying the first one-frame video image including the target area on a touch screen; detecting, via the touch screen, a control operation within the target area of the first one-frame video image; and controlling the smart device located in the target area based on the control operation.

17 Claims, 8 Drawing Sheets

(51) Int. Cl.
  *G06F 3/0482* (2013.01)
  *G06F 3/0484* (2013.01)
  *G06F 3/0488* (2013.01)
  *G06K 9/62* (2006.01)

(52) U.S. Cl.
  CPC ....... *G06F 3/0488* (2013.01); *G06K 9/00744* (2013.01); *G06K 9/6202* (2013.01)

(58) Field of Classification Search
  USPC ........................................................ 715/740
  See application file for complete search history.

(56) References Cited

U.S. PATENT DOCUMENTS

| | | | | |
|---|---|---|---|---|
| 9,998,596 | B1* | 6/2018 | Dunmire | H04M 3/5158 |
| 2014/0049558 | A1 | 2/2014 | Krauss et al. | |
| 2015/0012840 | A1* | 1/2015 | Maldari | H04L 65/60 |
| | | | | 715/748 |
| 2015/0227118 | A1* | 8/2015 | Wong | G05B 15/02 |
| | | | | 700/44 |
| 2017/0372165 | A1* | 12/2017 | Jouhikainen | G06K 9/4609 |
| 2018/0109999 | A1* | 4/2018 | Finnegan | H04L 12/4625 |
| 2018/0115788 | A1* | 4/2018 | Burns | G06K 9/00718 |
| 2018/0211401 | A1* | 7/2018 | Lee | G06T 7/593 |
| 2019/0080003 | A1* | 3/2019 | Alcantara | G06K 9/00369 |
| 2019/0087683 | A1* | 3/2019 | Liu | G06K 9/481 |
| 2019/0089934 | A1* | 3/2019 | Goulden | G08B 3/10 |
| 2019/0130202 | A1* | 5/2019 | Doumbouya | G06N 20/00 |

FOREIGN PATENT DOCUMENTS

| | | |
|---|---|---|
| CN | 105549403 A | 5/2016 |
| EP | 3 104 549 A1 | 12/2016 |

OTHER PUBLICATIONS

Yu et al., Human Localization via Multi-Camera and Floor Sensors in Smart Home, IEEE 2006, pp. 3822-3827. (Year: 2006).*
Kim et al., Resident Location-Recognition Algorithm Using a Bayesian Classifier in the PIP Sensor-Based Indoor Location-Aware System, IEEE 2009, pp. 240-245. (Year: 2009).*
Extended European Search Report dated Aug. 8, 2018 in European Patent Application No. 18162756.3, 9 pages.
Combined Chinese Office Action and Search Report dated Sep. 4, 2019 in Chinese Patent Application No. 201710169381.X (with English translation and English translation of Category of Cited Documents), 19 pages.

* cited by examiner

METHOD, APPARATUS FOR CONTROLLING A SMART DEVICE AND COMPUTER STORGE MEDIUM This application is based on and claims priority to Chinese Patent Application Serial No. 201710169381.X, filed with the State Intellectual Property Office on Mar. 21, 2017, the entire contents of which are incorporated herein by reference.

TECHNICAL FIELD

The present disclosure relates to the field of smart homes, and more particularly to a method and an apparatus for controlling a smart device, and a computer storage medium.

BACKGROUND

With the rapid development of smart devices, there have been more and more smart devices such as smart TVs, smart cameras, smart refrigerators and smart bulbs, etc. In order to maximize the function of smart devices, these smart devices could be bound to terminals such as mobile phones and computers to control the smart devices via the terminal.

In the related art, when controlling the smart device via the terminal, a smart home application could be installed on the terminal first, and the smart device could be bound to the user account logged in the smart home application. After that, when the user selects a smart device from the bound smart devices, the terminal displays the control interface of the smart device via the smart home application. In this way, the user can control the smart device via the control interface.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for controlling a smart device that is bound to a user account. The method includes acquiring a video stream captured by a smart camera that is bound to the user account, wherein the video stream includes multi-frame video that includes a plurality of one-frame video images; performing pattern recognition on each of the plurality of one-frame video images, wherein the pattern recognition is configured to determine an area that includes at least one smart device in at least one of the plurality of one-frame video images; determining, based on the pattern recognition, a target area that includes the smart device in a first one-frame video image of the plurality of one-frame video images; displaying the first one-frame video image including the target area on a touch screen; detecting, via the touch screen, a control operation within the target area of the first one-frame video image; and controlling the smart device located in the target area based on the control operation.

According to another aspect, the method also includes determining, based on the pattern recognition, a plurality of image areas in the first one-frame video image; performing feature extraction on each of the plurality of image areas; obtaining a plurality of first feature vectors based on the feature extraction; and determining a plurality of smart devices included in the first one-frame video image and corresponding ones of the plurality of image areas where each of the smart devices is located based on the plurality of first feature vectors and a plurality of second feature vectors, wherein there is a one-to-one correspondence between the plurality of second feature vectors and a plurality of smart devices bound to the user account.

In an example, the method includes, for each second feature vector of the plurality of second feature vectors, determining an Euclidean distance between the second feature vector and each first feature vector of the plurality of first feature vectors, to obtain a plurality of Euclidean distances; determining that the first one-frame video image includes the smart device corresponding to the second feature vector when a minimum Euclidean distance among the plurality of Euclidean distances is less than a distance threshold; and determining a first image area of the plurality of image areas that is associated with the minimum Euclidian distance as the target area that includes the smart device corresponding to the second feature vector in the first one-frame video image.

According to another aspect, the method includes, before determining that the first one-frame video image includes the smart device corresponding to the second feature vector, displaying identity confirmation information of the smart device, wherein the identity confirmation information of the smart device includes a device identification of the smart device corresponding to the second feature vector; and determining that the first one-frame video image includes the smart device corresponding to the second feature vector when a confirmation command for the identity confirmation information of the smart device is received.

According to yet another aspect, the method also includes, before determining the plurality of smart devices included in the first one-frame video image, acquiring an image of each smart device of the plurality of smart devices bound to the user account; performing feature extraction on each of the images of the plurality of smart devices to obtain feature vectors of the plurality of smart devices; and storing the feature vectors of the plurality of smart devices as the second feature vectors.

In an example, controlling the smart device located in the target area based on the control operation includes displaying a control interface of the smart device located in the target area, wherein the control interface includes a plurality of control options; receiving a selection operation that is configured to select one of the control options; and controlling the smart device based on the selected one of the control options.

Aspects of the disclosure also provide an apparatus for controlling a smart device that is bound to a user account. The apparatus includes a processor and a storage configured to store executable instructions executed by the processor. The processor is configured to acquire a video stream captured by a smart camera that is bound to the user account, wherein the video stream includes multi-frame video that includes a plurality of one-frame video images; perform pattern recognition on each of the plurality of one-frame video images, wherein the pattern recognition is configured to determine an area that includes at least one smart device in at least one of the plurality of one-frame video images; determine, based on the pattern recognition, a target area that includes the smart device in a first one-frame video image of the plurality of one-frame video images; display the first one-frame video image including the target area on a touch screen; detect, via the touch screen, a control operation within the target area of the first one-frame video image; and control the smart device located in the target area based on the control operation.

Aspects of the disclosure also provide a non-transitory computer-readable storage medium storing instructions that, when executed by one or more processors of a computing device, cause the computing device to acquire a video stream captured by a smart camera that is bound to the user account, wherein the video stream includes multi-frame video that includes a plurality of one-frame video images; perform pattern recognition on each of the plurality of one-frame video images, wherein the pattern recognition is configured to determine an area that includes at least one smart device in at least one of the plurality of one-frame video images; determine, based on the pattern recognition, a target area that includes the smart device in a first one-frame video image of the plurality of one-frame video images; display the first one-frame video image including the target area on a touch screen; detect, via the touch screen, a control operation within the target area of the first one-frame video image; and control the smart device located in the target area based on the control operation.

The technical solutions provided by the present disclosure may include the following advantageous benefits: in the aspects of the present disclosure, by acquiring the video stream captured by the smart camera, for each frame of video image in the video stream, the area where the at least one smart device included in the frame of video image is located is determined. Since the image of the smart device is included in the video image, the real situation of the smart device can be observed through the video image. In addition, the aspects of the present disclosure can perform the preset control operation in the area where the smart device is located in the video image, so as to control the smart device in the area. In this way, not only the operation status of the smart device can be observed in real time, but also the smart device can be controlled effectively, thereby improving the efficiency of controlling the smart device.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Figure 1:
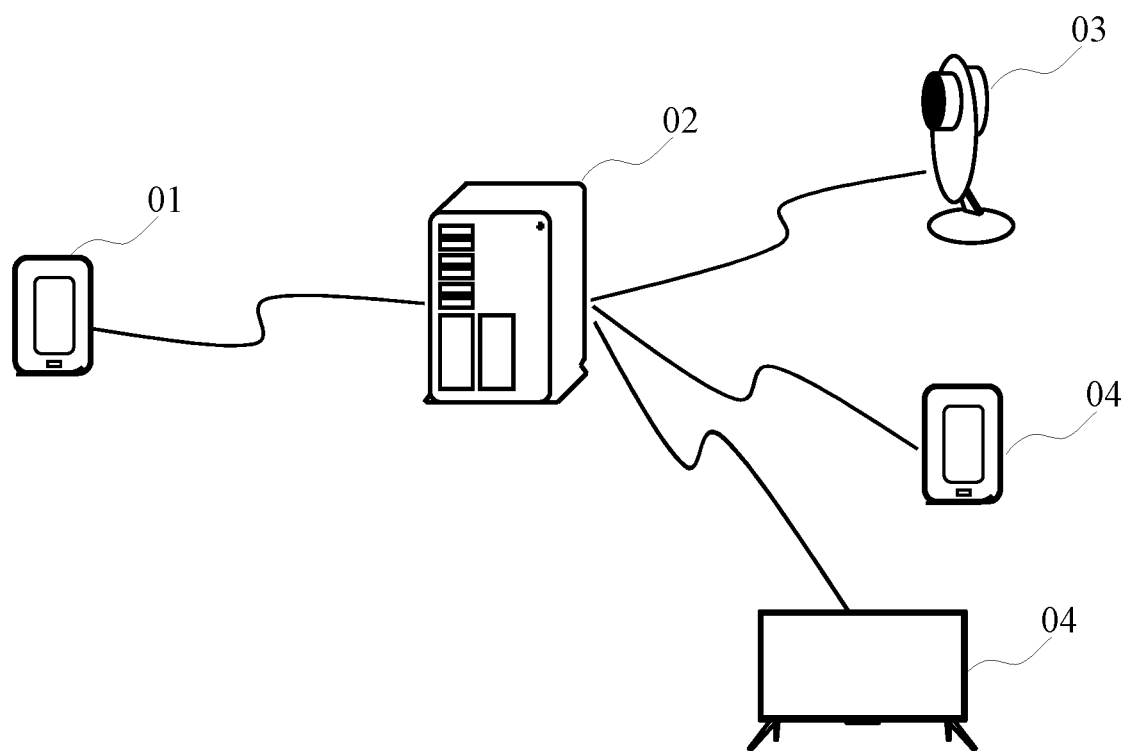
FIG. 1 is a schematic diagram illustrating an implementation environment, according to an exemplary aspect of the present disclosure.

The implementation environment of the aspects of the present disclosure is introduced prior to the detailed explanation of the aspects of the present disclosure. FIG. 1 is an implementation environment of the aspects of the present disclosure. Referring to FIG. 1, the implementation environment includes a terminal 01, a server 02, a smart camera 03, and a plurality of smart devices 04. The terminal 01 and the server 02 can communicate with each other through a wireless network or a wired network. The server 02 can also communicate with the smart camera 03 and the plurality of smart devices 04 through a wireless network or a wired network respectively. In this way, the terminal 01 can communicate with the smart camera 03 and the plurality of smart devices 04 respectively. In other words, the server 02 may serve as a bridge of communication between the terminal 01 and the smart camera 03 or the plurality of smart devices 04.

Wherein, the terminal 01 is used to install a smart home application and is bound to the smart camera 03 and the plurality of smart devices 04 through a user account logged in the smart home application. The smart camera 03 is used for capturing a video stream. In particular, the smart camera 03 is used for capturing a video for the location where the smart device 04 is deployed, thereby obtaining the video stream. The terminal 01 can acquire and display the video stream captured by the smart camera 03 through the server 02 and control the smart device 04 in the video image of the video stream via the displayed video stream.

It should be noted that the terminal 01 can be a device such as a mobile phone, a tablet computer and a computer, etc. Besides, in practice, the smart camera 03 also belongs to the smart device bound to the user account logged in the terminal 01. In the aspects of the present disclosure, since the smart device in the video image is controlled mainly through the video image in the video stream captured by the smart camera 03, the smart camera 03 is described separately. Further, in practice, the smart devices bound to the user account logged in the terminal 01 may include a plurality of smart devices, and only two smart devices in FIG. 1 are described as an example.

It is to be noted that when the smart camera 03 and the plurality of smart devices 04 are in the same local area network with the terminal 01, the terminal 01 can directly communicate with the smart camera 03 and the plurality of smart devices 04 without transiting via the server 02.

The applicable scenario of the aspects of the present disclosure is introduced as follows. As the user can remotely control the smart device via the terminal, and the user is often in a different position with the smart device in the remote control, the user may not be able to know the real situation of the smart device, thus could not be informed of the real situation timely when the network fails or the smart device fails, and then could not know whether the smart device has been effectively controlled. Therefore, the aspects of the present disclosure provide a method for controlling the smart device via the video images captured by the smart camera so that the smart device in the video images can be controlled while the user can observe the real situation of the smart device to improve the efficiency of control.

A method for controlling a smart device in the aspects of the present disclosure will be detailed below with reference to the drawings.

Figure 2:
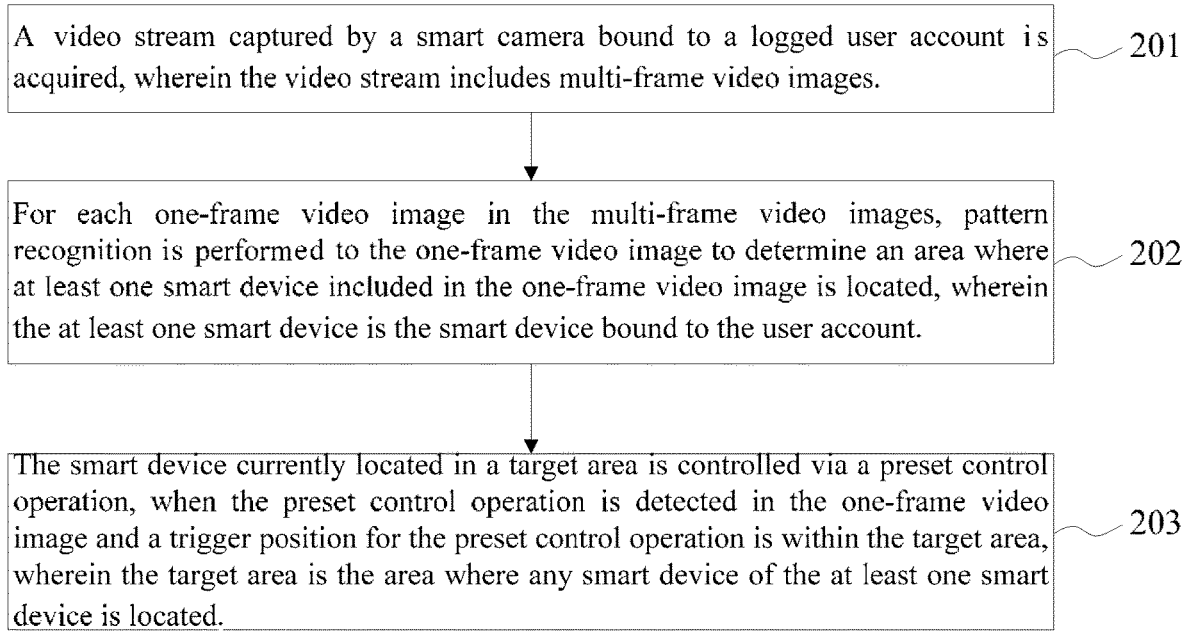
FIG. 2 is a flow chart showing a method for controlling a smart device, according to an exemplary aspect of the present disclosure.

FIG. 2 is a flowchart of a method for controlling a smart device, according to an exemplary aspect. Referring to FIG. 2, the method for controlling the smart device is applied to a terminal and includes the following steps.

At step 201, a video stream captured by a smart camera bound to a logged user account is acquired. The video stream includes multi-frame video images.

At step 202, for each one-frame video image in the multi-frame video images, pattern recognition is performed to the one-frame video image to determine an area where at least one smart device included in the one-frame video image is located. The at least one smart device is the smart device bound to the user account.

At step 203, the smart device currently located in a target area is controlled via a preset control operation, when the preset control operation is detected in the one-frame video image and a trigger position for the preset control operation is within the target area. The target area is the area where any smart device of the at least one smart device is located.

In the aspects of the present disclosure, by acquiring the video stream captured by the smart camera, the area where the at least one smart device included in each one-frame video image of the video stream is located is determined. Since the image of the smart device is included in the video image, the real situation of the smart device can be observed through the video image. In addition, the aspects of the present disclosure can perform the preset control operation in the area where the smart device is located in the video image, so as to control the smart device in the area. In this way, not only the operation status of the smart device can be observed in real time, but also the smart device can be controlled effectively, thereby improving the efficiency of controlling the smart device.

In some aspects, performing the pattern recognition to the one-frame video image to determine the area where the at least one smart device included in the one-frame video is located comprises: determining a plurality of image areas from the one-frame video image; performing feature extraction for the plurality of image areas respectively, to obtain a plurality of first feature vectors; and determining the at least one smart device included in the one-frame video image and the area where each smart device is located in the one-frame video image, in accordance with the plurality of first feature vectors and a plurality of second feature vectors stored in advance. There is a one-to-one correspondence between the plurality of second feature vectors and a plurality of smart devices bound to the user account.

In some aspects, determining the at least one smart device included in the one-frame video image and the area where each smart device is located in the one-frame video image, in accordance with the plurality of first feature vectors and the plurality of pre-stored second feature vectors comprises: for each second feature vector of the plurality of second feature vectors, determining an Euclidean distance between the second feature vector and each first feature vector of the plurality of first feature vectors, to obtain a plurality of Euclidean distances; and determining that the one-frame video image includes the smart device corresponding to the second feature vector when a minimum Euclidean distance among the plurality of Euclidean distances is less than a preset distance threshold, and determining the image area corresponding to the first feature vector for determining the minimum Euclidean distance as the area where the smart device corresponding to the second feature vector is located in the one-frame video image.

In some aspects, before determining that the one-frame video image includes the smart device corresponding to the second feature vector, the method further comprises: displaying identity confirmation information of the device, wherein the identity confirmation information of the device carries a device identification of the smart device corresponding to the second feature vector; and performing the step of determining that the one-frame video image includes the smart device corresponding to the second feature vector when a confirm command for the identity confirmation information of the device is received.

In some aspects, before determining the at least one smart device included in the one-frame video image, in accordance with the plurality of first feature vectors and the plurality of second feature vectors stored in advance, the method further comprises: acquiring an image of each smart device of the plurality of smart devices bound to the user account; performing feature extraction for the image of each smart device of the plurality of smart devices, to obtain a feature vector of each smart device of the plurality of smart devices; and storing the feature vector of each smart device of the plurality of smart devices as the second feature vector.

In some aspects, controlling the smart device currently located in the target area via the preset control operation comprises: displaying a control interface of the smart device currently located in the target area, wherein the control interface includes a plurality of control options; and controlling the smart device currently located in the target area via the control option selected by a selection operation, when the selection operation on any of the plurality of control options is detected.

All of the selectable technique solutions described above may be selected in any combination to form alternative aspects of the present disclosure, and will not be described again herein.

Figure 3A:
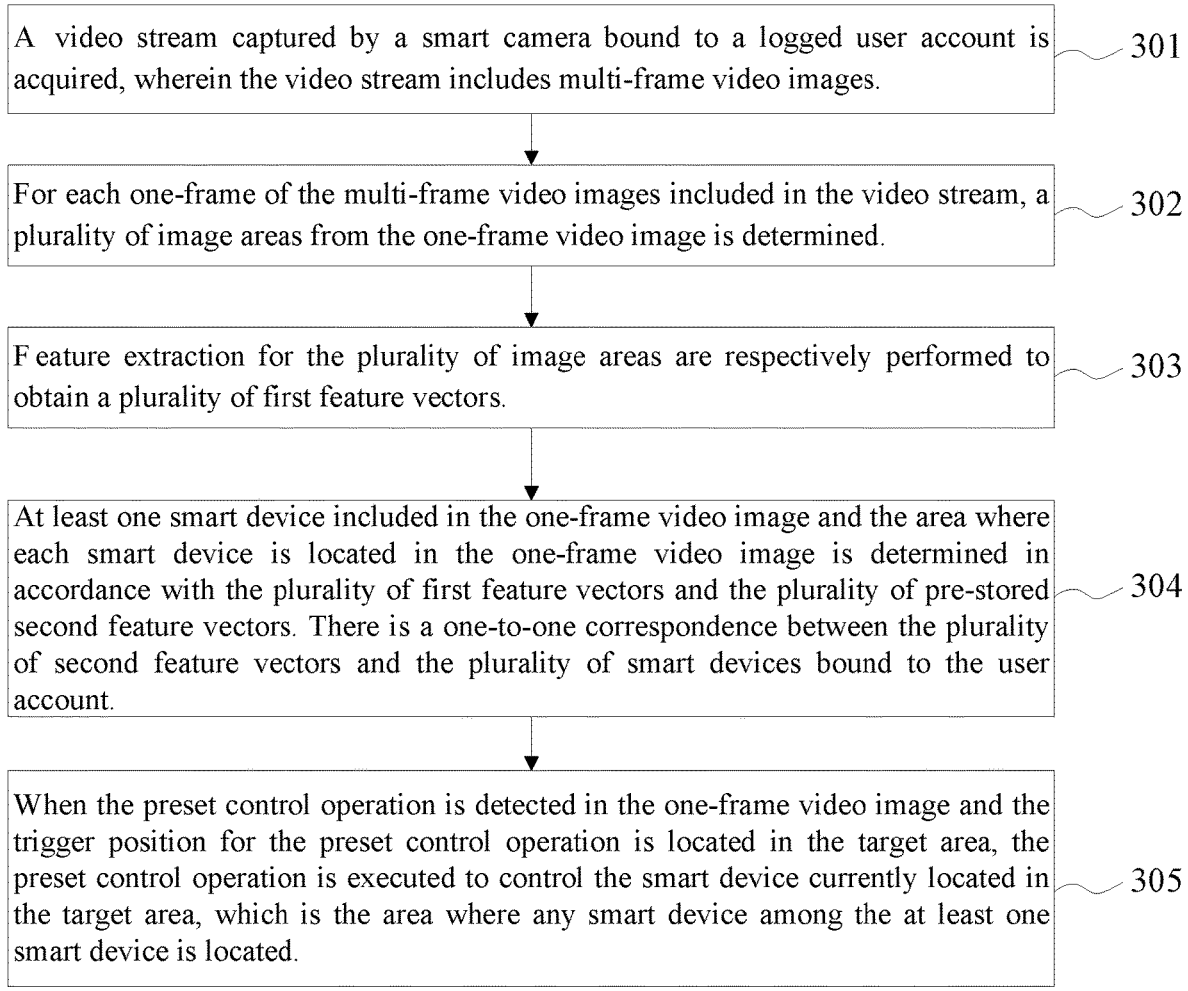
FIG. 3A is a flow chart showing another method for controlling an smart device, according to an exemplary aspect of the present disclosure.

FIG. 3A is a flowchart illustrating a method for controlling a smart device, according to an exemplary aspect. The aspect illustrated in FIG. 2 will be detailed below with reference to FIG. 3A. Referring to FIG. 3A, the method for controlling the smart device is applied to the terminal and comprises the following steps.

At step 301, a video stream captured by a smart camera bound to a logged user account is acquired, wherein the video stream includes multi-frame video images.

Since the smart camera can be bound to the user account logged in the terminal and the smart camera is used to capture the video stream, the terminal can acquire the video stream captured by the smart camera. In addition, since the terminal may be or may not be in the same local area network with the smart camera, the terminal can acquire the video stream captured by the smart camera in two ways.

A first way: when the terminal is in the same local area network with the smart camera, the terminal can acquire the video stream captured by the smart camera through the gateway of the local area network.

Since the terminal and smart camera usually need to access the network through the gateway, that is, the gateway is the auxiliary device for the terminal and the smart camera to access network. Therefore, the terminal can send an acquisition request to the gateway. After receiving the acquisition request, the gateway can communicate with the smart camera to acquire the video stream captured by the smart camera and send the acquired video stream to the terminal.

Of course, the terminal can acquire from the gateway the video stream captured by the smart camera through other manners. For example, in order to playback the video stream captured by the smart camera at a later stage, after capturing the video stream, the smart camera can also upload it to the server through the network for the server to store. As the gateway is the auxiliary device for the terminal and the smart camera to access network, that is, when the smart camera interacts with other devices through the network, the interactive data needs to be transmitted through the gateway. Therefore, in this case, when the smart camera uploads the captured video stream to the server, the gateway can send the video stream captured by the smart camera to the terminal, and the terminal has no need to acquire the video stream captured by the smart camera from the gateway.

A second way: when the terminal is not in the same local area network with the smart camera, the terminal can acquire the video stream captured by the smart camera through the server.

Since the server is the bridge of communication between the terminal and smart camera, when the terminal is not in the same local area network with the smart camera, the terminal can send an acquisition request to the server. Then the server can communicate with the smart camera to acquire the video stream captured by the smart camera and send the acquired video stream to the terminal.

Of course, the terminal can acquire from the server the video stream captured by the smart camera through other manners. For example, in order to playback the video stream captured by the smart camera at a later stage, after capturing the video stream, the smart camera can also upload the captured video stream to the server through the network for the server to store. Therefore, when the server receives the acquisition request from the terminal or when the server receives the video stream uploaded by the smart camera, the server can directly send the stored video stream captured by the smart camera to the terminal.

It should be noted that the user account logged in the terminal is registered from the server. When there is a plurality of smart cameras bound to the logged user account, the acquisition request sent by the terminal when acquiring the video stream captured by the smart camera can also carry the identification of the smart camera, so that it can accurately acquire the video stream captured by a smart camera in accordance with the identification. Wherein, the identification could be a name, a MAC (Medium Access Control, media access control) address, a production serial number of the smart camera, etc.

At step 302, for each one-frame of the multi-frame video images included in the video stream, a plurality of image areas from the one-frame video image is determined.

The plurality of image areas are determined from the one-frame video image to determine the area where the smart device included in the one-frame video image is located. However, the smart device generally has certain external shape, and the binarization processing is in favor of further processing of the image and can highlight the outline of the object in the image more clearly to make the image become simple. Therefore, the aspects of the present disclosure can perform the binarization processing on the one-frame video image to obtain a binary image, and then determine the image area in which the included smart device is located from the binary image.

Wherein, performing the binarization processing on the one-frame video image means setting gray value of pixel points on the one-frame video image as a first value or a second value. That is, a visual effect of black and white for the whole video image is presented. The manners for the binarization processing include two-peak manner, iterative manner, and P parameter manner and so forth. Apart from the listed manners, there are other manners for the binarization processing, which is not listed in detail any more.

It should be noted that the first value and the second value can be preset, and the first value is greater than the second value. For example, the first value can be 255, 254, 253 and so forth, and the second value can be 0, 1, 2, and so forth. To achieve an effect of accurate emphasis of the outer contour of the smart device, the first value can be 255, and the second value can be 0.

Of course, in the aspects of the present disclosure, apart from determining a plurality of image areas from the one-frame video image through above binarization processing manner, in practice, a window with a preset size may be moved in the one-frame video image according to a certain rule to determine the plurality of image areas from the one-frame video image. Wherein, the rule can be the moving distance and direction of the window each time.

Alternatively, the plurality of image areas may be determined from the one-frame video image by the user. That is, when the one-frame video image is displayed, the plurality of image areas is drawn out by the user from the one-frame video image. Of course, the plurality of image areas can be determined by directly performing area division for the one-frame video image.

At step 303, feature extraction for the plurality of image areas are respectively performed to obtain a plurality of first feature vectors.

Wherein, the terminal may extract the features for the plurality of image areas respectively and generate a plurality of first feature vectors with the extracted features. Wherein, when the terminal extracts the features for the plurality of image areas, it could extract at least one of the color feature, the shape feature, and the texture feature. Of course, other features could also be extracted.

For example, three image areas are determined from the one-frame video image, respectively, area 1, area 2 and area 3. The feature is extracted for the area 1 to generate a first feature vector 1; the feature is extracted for the area 2 to generate a first feature vector 2; the feature is extracted for the area 3 to generate a first feature vector 3.

At step 304, at least one smart device included in the one-frame video image and the area where each smart device is located in the one-frame video image is determined in accordance with the plurality of first feature vectors and the plurality of pre-stored second feature vectors. There is a one-to-one correspondence between the plurality of second feature vectors and the plurality of smart devices bound to the user account.

At this step, for each second feature vector of the plurality of second feature vectors, an Euclidean distance between the second feature vector and each first feature vector of the plurality of first feature vectors may be determined respectively to obtain a plurality of Euclidean distances. When a minimum Euclidean distance among the plurality of Euclidean distances is less than a preset distance threshold, it is determined that the one-frame video image includes the smart device corresponding to the second feature vector, and the image area corresponding to the first feature vector for determining the minimum Euclidean distance is determined as the area where the smart device corresponding to the second feature vector is located in the one one-frame video image.

There is a one-to-one correspondence between the plurality of second feature vectors and the plurality of smart devices bound to the user account, and for the plurality of image areas in the one-frame video image, there is a one-to-one correspondence between the plurality of first feature vectors and the plurality of image areas. Therefore, after the Euclidean distance is determined by the second feature vector and the first feature vector, if the minimum Euclidean distance is less than the preset distance threshold, it may be determined that the second feature vector for determining the minimum Euclidean distance is similar with the first feature vector, to further determine that the smart device included in the image area corresponding to the first feature vector for calculating the minimum Euclidean distance is similar to the smart device corresponding to the second feature vector. In the aspects of the present disclosure, in this case, it may be directly determined the smart device corresponding to the second feature vector is included in the one-frame video image, and the image area corresponding to the first feature vector for determining the minimum Euclidean distance may be determined as the area where the smart device corresponding to the second feature vector is located in the one-frame video image.

Wherein, in the process of determining the Euclidean distance between the second feature vector and the first feature vector, differences between corresponding feature values in the second feature vector and in the first feature vector can be determined, and the sum of squares for the determined differences is extracted a root, to obtain the Euclidean distance between the second feature vector and the first feature vector.

Furthermore, when the determined minimum Euclidean distance among the plurality of Euclidean distances is less than the preset distance threshold, the smart device included in the image area corresponding to the first feature vector for calculating the minimum Euclidean distance may only be similar to the smart device corresponding to the second feature vector. Therefore, in order to ensure the accuracy of the smart device determined from the one-frame video image, before determining that the smart device corresponding to the second feature vector is included in the one-frame video image, the identity confirmation information of the device may be displayed. The identity confirmation information of the device carries the device identification of the smart device corresponding to the second feature vector. When the confirm command for the identity confirmation information of the device is received, the smart device corresponding to the second feature vector is then confirmed to be included in the one-frame video image.

Wherein, the device identification of the smart device is used to uniquely identify the smart device. The device identification could be the name, the MAC address, the production serial number, etc. of the smart device. In addition, the identity confirmation information of the device is used to determine whether or not the smart device included in the image area corresponding to the first feature vector for calculating the minimum Euclidean distance is the smart device corresponding to the second feature vector, and the identity confirmation information includes a confirmation option and a cancel option. In order to facilitate the user to confirm whether or not the smart device included in the image area corresponding to the first feature vector for calculating the minimum Euclidean distance is the smart device corresponding to the second feature vector, the image area may be marked on the one-frame video image and the display window of the identity confirmation information of the device may be displayed above the layer of the one-frame video image without blocking the marked image area. After that, when the user clicks the confirmation option, a confirmation command can be triggered, and it is determined that the smart device corresponding to the second feature vector is included in the one-frame video image. When the user clicks the cancel option, the cancel command can be triggered, and it is determined that the smart device corresponding to the second feature vector is not included in one-frame video image.

Of course, the above description only takes the confirmation option and the cancel option in the identity confirmation information as an example. In practice, the identity confirmation information can also display the device identifications of all the smart devices bound to the user account, and each of the device identifications corresponds to a selection option. The selection option of the device identification of the smart device corresponding to the second feature vector is selected by default in the identity confirmation information, to realize the function of determining whether or not the smart device included in the image area corresponding to the first feature vector for calculating the minimum Euclidean distance is the smart device corresponding to the second feature vector. If not, the user may also select the smart device included in the image area corresponding to the first feature vector for calculating the minimum Euclidian distance from other device identifications. In this way, not only the identification of the smart device in the image area can be confirmed, but also the device identification of the accurate smart device can be reselected when the device identification selected by default in the identity confirmation information of the device is not the device identification of the smart device included in the image area, without re-executing the above process, which improves the efficiency of determining the smart device in the video image.

Figure 3B:
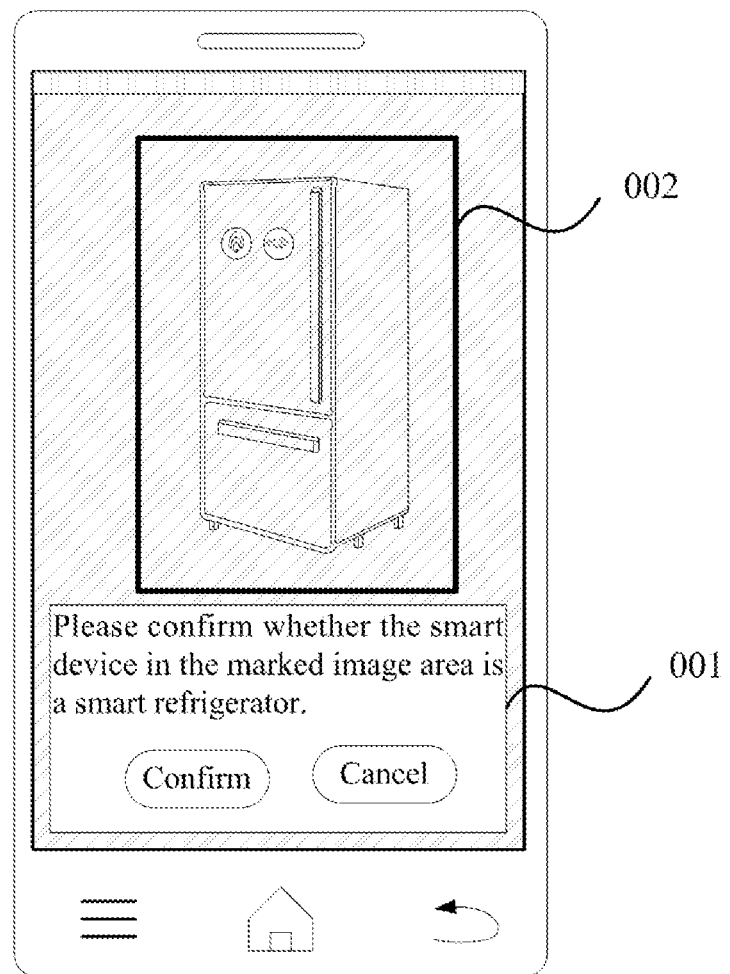
FIG. 3B is a schematic diagram illustrating a display interface of identity confirmation information of a device, according to an exemplary aspect of the present disclosure.

For example, the terminal may display the identity confirmation information 001 of the device as shown in FIG. 3B, which includes the prompt information "Please confirm whether the smart device in the marked image area is smart refrigerator 1", the confirmation option and the cancel option. The image area corresponding to the first feature vector for calculating the minimum Euclidean distance can also be marked with a rectangular box 002 in the one-frame video image.

Figure 3C:
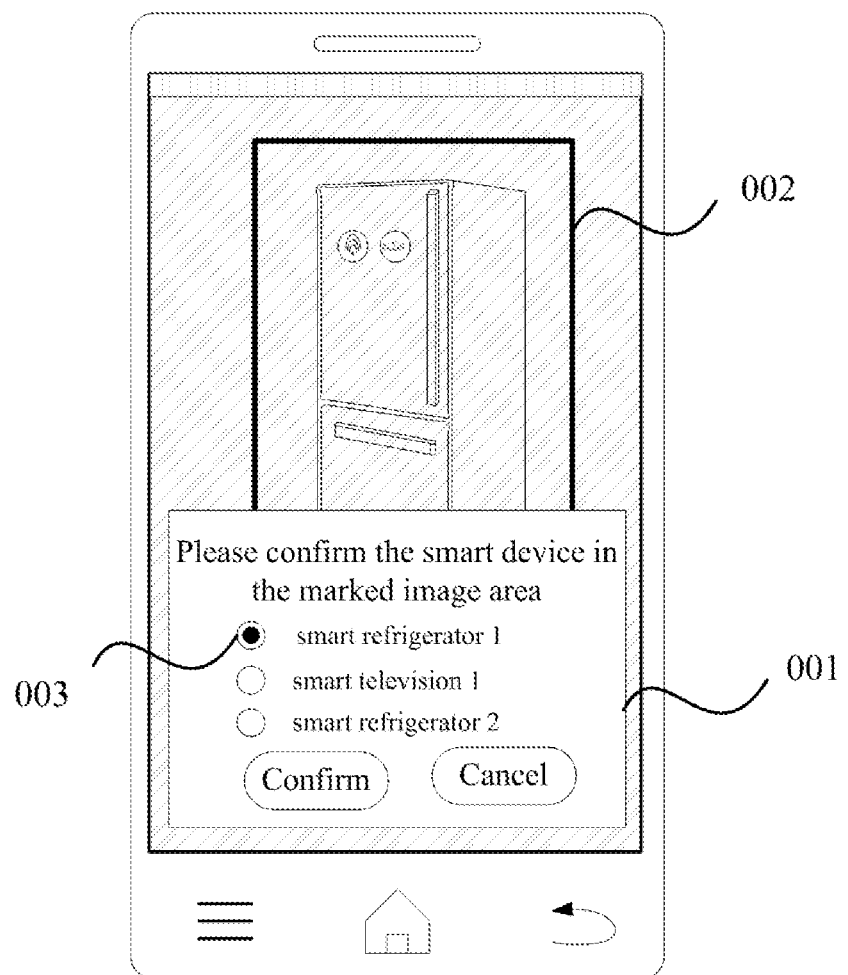
FIG. 3C is a schematic diagram illustrating another display interface of identity confirmation information of a device, according to an exemplary aspect of the present disclosure.
Figure 3D:
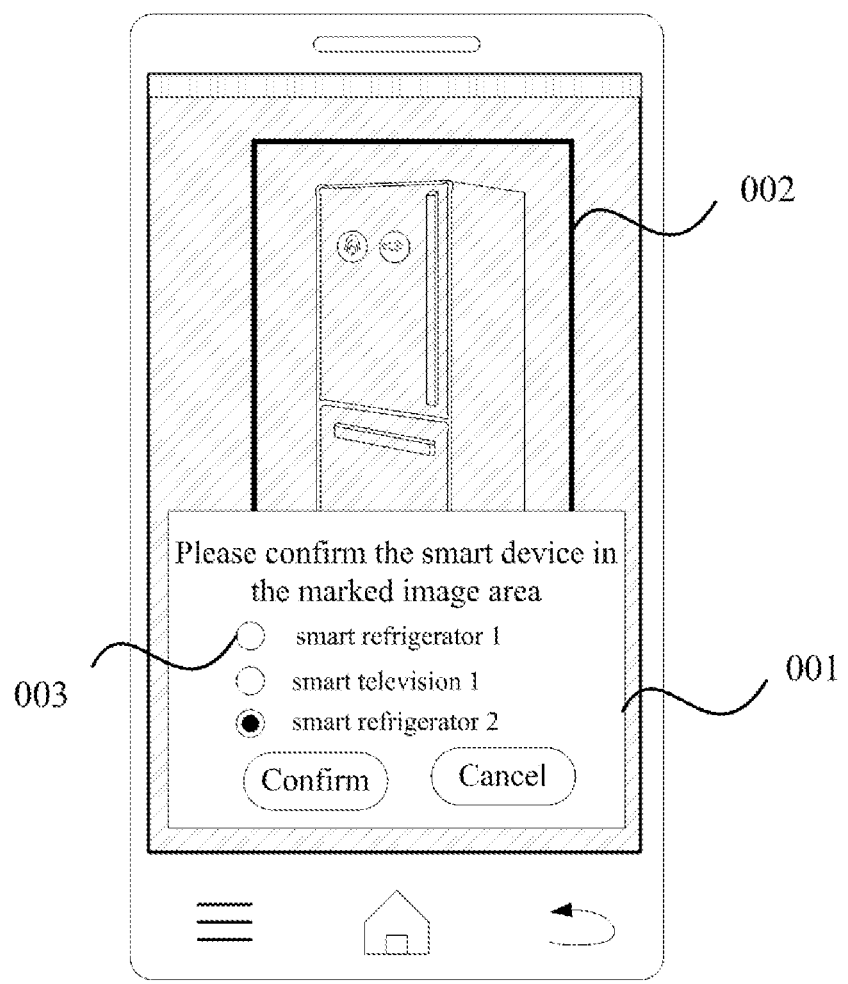
FIG. 3D is a schematic diagram illustrating a further display interface of identity confirmation information of a device, according to an exemplary aspect of the present disclosure.

Of course, the terminal may also display the identity confirmation information of the device as shown in FIG. 3C, in which the device identifications of all the smart devices bound to the user account can be displayed, and each device identification corresponds to a selection option 003. Assuming that the device identification of the smart device corresponding to the second feature vector is identification 1, the selection option 003 of the identification 1 is selected by default in the identity confirmation information. In addition, the confirmation option and the cancel option may also be included in the identity confirmation information. If the device identification selected by default is the identification of the smart device in the image area marked with a rectangle in the one-frame video image, assumed to be the smart refrigerator 1, the user can select the confirmation option. Otherwise, the user can also select the device identification of other smart devices and select the selection option of the selected device identification. Assuming that the user thinks that the smart device in the marked image area is identified as the smart refrigerator 2, the user can select the selection option of the smart refrigerator 2, as shown in FIG. 3D, to determine the smart device in the marked image area.

Furthermore, before the terminal determines the at least one smart device included in the one-frame video image in accordance with the plurality of first feature vectors and the plurality of pre-stored second feature vectors, the terminal may acquire the image of each smart device of the smart devices bound to the user account. And the image features of the plurality of smart devices are extracted respectively to obtain the feature vectors of the plurality of smart devices. The feature vectors of the plurality of smart devices are stored as second feature vectors to obtain a plurality of second feature vectors.

It is to be noted that with the method described above, the aspects of the present disclosure can not only determine the at least one smart device included in the one-frame video image and the area in which each smart device is located in the one-frame video image. Of course, in practice, it can also be determined by other methods. For example, a plurality of images of each smart device among the plurality of smart devices bound to the user account may be acquired and a training is performed for the plurality of images to generate a classifier of the smart device. After that, a plurality of image areas can be determined from the one-frame video image and the plurality of image areas serves as the input of the classifier of the smart device to obtain the classification result, which is used as the basis to determine the at least one smart device and the area in which each smart device is located in the one-frame video image. That is, when the classification result is a first preset value, it is determined that the smart device is included in the one-frame video image, and the input image area is the area where the smart device is located in the one-frame video image. When the classification result is a second preset value, it is determined that the smart device is not included in the one-frame video image. Wherein, the classifier can be a preset classifier, and can be obtained based on a training of images of the plurality of smart devices.

At step 305, when the preset control operation is detected in the one-frame video image and the trigger position for the preset control operation is located in the target area, the preset control operation is executed to control the smart device currently located in the target area, which is the area where any smart device among the at least one smart device is located.

Usually, when controlling the smart device, the simplest control method is the control of switching on or off the smart device. Therefore, in the aspects of the president disclosure, when the preset control operation is detected in the one-frame video image and the trigger position for the preset control operation is located in the target area, the preset control operation can then control the smart device located in the target area to be on if the smart device located in the target area is currently off; and the preset control operation can then control the smart device located in the target area to be off if the smart device located in the target area is currently on.

In practice, the user may not only want to control the smart device to be on or off, but also control other operations of the smart device. For example, for a smart air conditioner, the user may also want to control to raise or lower the temperature of the air conditioner, or control the wind speed of smart air conditioner, etc. Therefore, when the smart device currently located in the target area is controlled via the preset control operation, a control interface of the smart device currently located in the target area may be displayed. The control interface includes a plurality of control options. When the selection operation on any one of the plurality of control options is detected, the smart device currently located in the target area is controlled via the control option selected by the selection operation.

Wherein, the plurality of control options may be options for controlling the smart device to perform a plurality of control operations. That is, when a control option is selected from the plurality of control options, the smart device located in the target area can be controlled to perform the control operation corresponding to the control option.

Figure 3E:
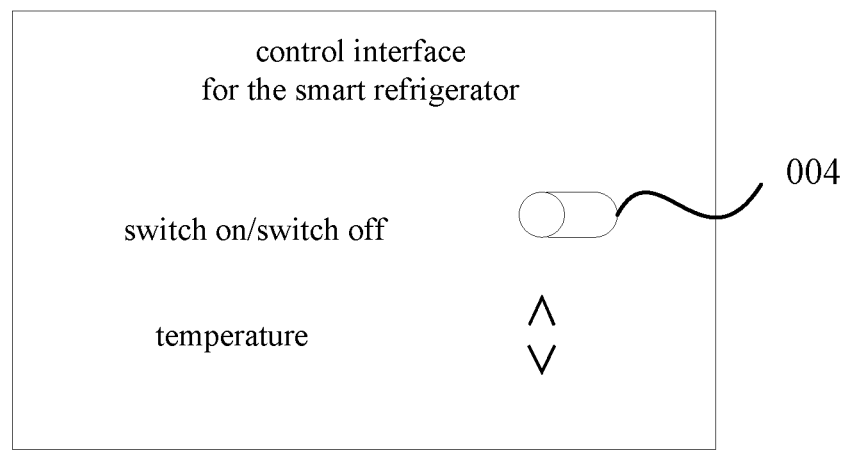
FIG. 3E is a schematic diagram illustrating a control interface of a smart device, according to an exemplary aspect of the present disclosure.

For example, the smart device currently located in the target area is a smart refrigerator, which can display the control interface as shown in FIG. 3E. The control interface includes two options, i.e. "switch on/switch off" option, and "temperature" option respectively. When the smart device located in the target area is currently off, for the "switch on/switch off" option, the smart device can be controlled to be on by pressing a switch button 004; the smart device can be controlled to be off by pressing the switch button 004 again. For the "temperature" option, the temperature can be raised by pressing the "/\" button; the temperature could be lowered by pressing the "\/" button.

It is to be noted that, in the aspects of the present disclosure, when the terminal and the smart device located in the target area are in the same local area network, the terminal can directly send the control command corresponding to the preset control operation to the smart device to control the smart device. When the terminal and the smart device located in the target area are not in the same local area network, the terminal can send the control command corresponding to the preset control operation to the server such that the server can forward the control command to the smart device, to control the smart device.

In addition, in the aspects of the present disclosure, the terminal communicates with the server, or the server communicates with the smart device, via a preset device control protocol in accordance with the TCP (Transmission Control Protocol)/IP (Internet Protocol) network. Of course, in practice, communication may also be established in accordance with other protocols and networks. The aspects of the present disclosure do not limit thereto.

In the aspects of the present disclosure, the area where at least one smart device included in each one-frame video image of the video stream is located is determined by acquiring the video stream captured by the smart camera. Since the image of the smart device is included in the video image, the real situation of the smart device can be observed through the video image. In addition, the aspects of the present disclosure can perform the preset control operation in the area where the smart device is located in the video image, so as to control the smart device in the area correspondingly. It can not only observe the operation status of the smart device in real time, but also effectively control the smart device, thereby improving the efficiency of controlling the smart device.

An apparatus for controlling a smart device described in an exemplary aspect of the present disclosure can achieve the method for controlling a smart device of the present disclosure. The apparatus includes a processor and a storage storing executable instructions executed by the processor; wherein, the processor is configured to: acquire a video stream captured by a smart camera bound to a logged user account, wherein the video stream includes multi-frame video images; for each one-frame video image in the multi-frame video images, perform pattern recognition to the one-frame video image to determine an area where at least one smart device included in the one-frame video image is located, wherein the at least one smart device is the smart device bound to the user account; and control the smart device currently located in a target area via a preset control operation, when the preset control operation is detected in the one-frame video image and a trigger position for the preset control operation is within the target area, wherein the target area is the area where any smart device of the at least one smart device is located.

In some aspects, the processor is configured to: determine a plurality of image areas from the one-frame video image; perform feature extraction for the plurality of image areas respectively, to obtain a plurality of first feature vectors; and determine the at least one smart device included in the one-frame video image and the area where each smart device is located in the one-frame video image, in accordance with the plurality of first feature vectors and a plurality of pre-stored second feature vectors, wherein there is a one-to-one correspondence between the plurality of second feature vectors and the plurality of smart devices bound to the user account.

In some aspects, the processor is configured to: for each second feature vector of the plurality of second feature vectors, determine an Euclidean distance between the second feature vector and each first feature vector of the plurality of first feature vectors, to obtain a plurality of Euclidean distances; and determine that the one-frame video image includes the smart device corresponding to the second feature vector when a minimum Euclidean distance among the plurality of Euclidean distances is less than a preset distance threshold, and determine the image area corresponding to the first feature vector for determining the minimum Euclidean distance as the area where the smart device corresponding to the second feature vector is located in the one-frame video image.

In some aspects, the processor is configured to: display identity confirmation information of the device, wherein the identity confirmation information of the device carries a device identification of the smart device corresponding to the second feature vector; and perform the step of determining that the one-frame video image includes the smart device corresponding to the second feature vector when a confirmation command for the identity confirmation information of the device is received.

In some aspects, the processor is configured to: acquire an image of each smart device of the plurality of smart devices bound to the user account; perform feature extraction for the image of each smart device of the plurality of smart devices, to obtain a feature vector of each smart device of the plurality of smart devices; and store the feature vector of each smart device of the plurality of smart devices as the second feature vector.

In some aspects, the processor is configured to: display a control interface of the smart device currently located in the target area, wherein the control interface includes a plurality of control options; and control the smart device currently located in the target area via the control option selected by a selection operation, when the selection operation on any of the plurality of control options is detected.

In the aspects of the present disclosure, the area of at least one smart device included in each one-frame video image of the video stream is determined by acquiring the video stream captured by the smart camera. Since the image of the smart device is included in the video image, the real situation of the smart device can be observed through the video image. In addition, the aspects of the present disclosure can perform the preset control operation in the area where the smart device is located in the video image, so as to control the smart device in the area correspondingly. It can not only observe the operation status of the smart device in real time, but also effectively control the smart device, thereby improving the efficiency of controlling the smart device.

With respect to the apparatus of the above aspect, the specific manners for performing operations for individual modules therein have been described in detail in the aspects regarding the methods for controlling the smart device, and will not be elaborated herein.

Figure 4:
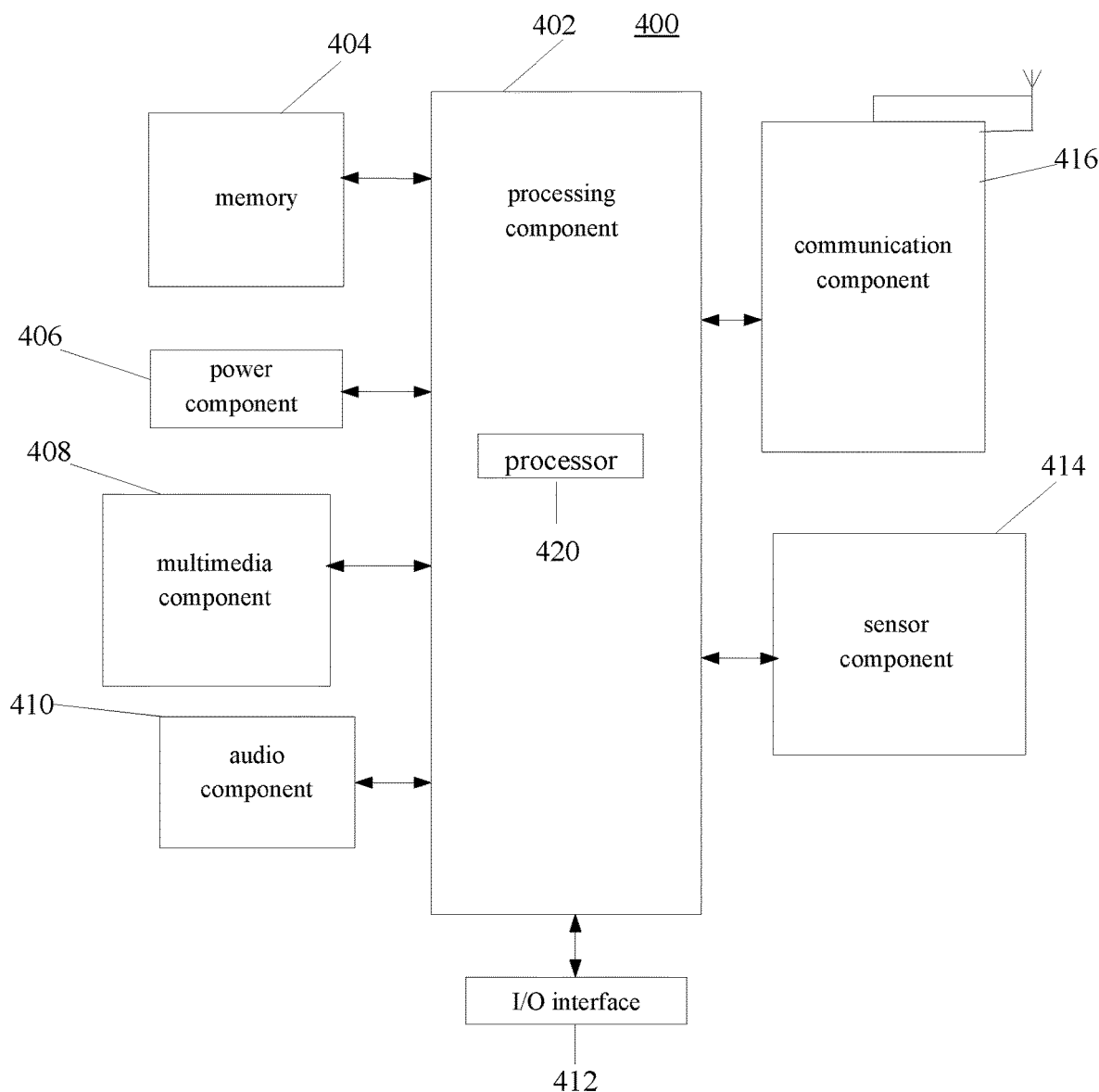
FIG. 4 is a block diagram of an apparatus for controlling a smart device, according to an exemplary aspect of the present disclosure.

FIG. 4 is a block diagram of an apparatus 400 for controlling a smart device, according to an exemplary aspect. For example, the apparatus 400 may be a mobile phone, a computer, a digital broadcast terminal, a messaging device, a game console, a tablet device, a medical device, an exercise device, a personal digital assistant, and the like.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls the overall operations of the apparatus 400, such as operations associated with display, telephone call, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data can include instructions for any applications or methods operated on the apparatus 400, contact data, phonebook data, messages, pictures, videos, etc. The memory 404 may be implemented using any type of volatile or non-volatile memory devices or a combination thereof, such as static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic or optical disk.

The power component 406 provides power to the various components of the apparatus 400. The power component 406 may include a power management system, one or more power sources, and other components associated with the generation, management, and distribution of power in the apparatus 400.

The multimedia component 408 includes a screen providing an output interface between the apparatus 400 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensors may not only sense a boundary of a touch or swipe action, but also sense a period of time and a pressure associated with the touch or swipe action. In some aspects, the multimedia component 408 includes a front camera and/or a rear camera. The front camera and/or the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the apparatus 400 is in an operation mode, such as a call mode, a recording mode, and a voice recognition mode. The received audio signal may be further stored in the memory 404 or transmitted via the communication component 416. In some aspects, the audio component 510 further includes a speaker for outputting audio signals.

The I/O interface 412 provides an interface between the processing component 402 and peripheral interface modules, such as a keyboard, a click wheel, button, and the like. The buttons may include, but are not limited to, a home button, a volume button, a starting button, and a locking button.

The sensor component 414 includes one or more sensors to provide status assessments of various aspects of the apparatus 400. For example, the sensor component 414 may detect an open/closed status of the apparatus 400, relative positioning of components, e.g., the components the display and the keypad, of the apparatus 400, a change in position of the apparatus 400 or a component of the apparatus 400, a presence or absence of the user contact with the apparatus 400, orientation or an acceleration/deceleration of the apparatus 400, and a change in temperature of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some aspects, the sensor component 414 may also include an acceleration sensor, a gyroscope sensor, a magnetic sensor, a pressure sensor, or a temperature sensor.

The communication component 416 is configured to facilitate communication, wired or wirelessly, between the apparatus 400 and other apparatuses. The apparatus 400 can access a wireless network based on a communication standard, such as WiFi, 2G or 3G, or a combination thereof. In one exemplary aspect, the communication component 416 receives a broadcast signal or broadcast associated information from an external broadcast management system via a broadcast channel. In one exemplary aspect, the communication component 416 further includes a near field communication (NFC) module to facilitate short-range communications. For example, the NFC module may be implemented based on radio frequency identification (RFID) technology, an infrared data association (IrDA) technology, an ultra-wideband (UWB) technology, a Bluetooth (BT) technology and other technologies.

In exemplary aspects, the apparatus 400 may be implemented with one or more application specific integrated circuits (ASICs), digital signal processors (DSPs), digital signal processing devices (DSPDs), programmable logic devices (PLDs), field programmable gate array (FPGA), controllers, microcontrollers, microprocessors, or other electronic components, for performing the above described methods.

In exemplary aspects, there is also provided a non-transitory computer-readable storage medium including instructions, and the storage medium stores at least one piece of instruction, at least one segment of program, a set of codes or a set of instructions. The at least one piece of instruction, the at least one segment of program, the set of codes or the set of instructions is loaded and executed by the processor to achieve the above mentioned method for controlling the smart device. The medium can be for example the memory 404 including instructions, which can be executed by the processor 420 in the apparatus 400, for performing the above-described methods. For example, the non-transitory computer readable storage medium may be a ROM, a random access memory (RAM), a CD-ROM, a magnetic tape, a floppy disc, an optical data storage device, and the like.

The mobile terminal can perform the method for controlling the smart device shown in FIG. 2 or FIG. 3A in accordance with the non-transitory computer readable storage medium, when the instructions in the storage medium are executed by the processor of the mobile terminal.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the content disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a smart device that is bound to a user account, comprising:
    acquiring a video stream captured by a smart camera that is bound to the user account, wherein the video stream includes multi-frame video that includes a plurality of one-frame video images;

performing pattern recognition on each of the plurality of one-frame video images, wherein the pattern recognition is configured to determine an area that includes at least one smart device in at least one of the plurality of one-frame video images;

determining, based on the pattern recognition, a target area that includes the smart device in a first one-frame video image of the plurality of one-frame video images;

displaying the first one-frame video image including the target area on a touch screen;

detecting, via the touch screen, a control operation within the target area of the first one-frame video image; and controlling the smart device located in the target area based on the control operation, wherein the method further comprises:

determining, based on the pattern recognition, a plurality of image areas in the first one-frame video image;

performing feature extraction on each of the plurality of image areas;

obtaining a plurality of first feature vectors based on the feature extraction; and determining a plurality of smart devices included in the first one-frame video image and corresponding ones of the plurality of image areas where each of the smart devices is located based on the plurality of first feature vectors and a plurality of second feature vectors, wherein there is a one-to-one correspondence between the plurality of second feature vectors and a plurality of smart devices bound to the user account.

2. The method of claim 1, further comprising:

for each second feature vector of the plurality of second feature vectors, determining an Euclidean distance between the second feature vector and each first feature vector of the plurality of first feature vectors, to obtain a plurality of Euclidean distances;

determining that the first one-frame video image includes the smart device corresponding to the second feature vector when a minimum Euclidean distance among the plurality of Euclidean distances is less than a distance threshold; and determining a first image area of the plurality of image areas that is associated with the minimum Euclidian distance as the target area that includes the smart device corresponding to the second feature vector in the first one-frame video image.

3. The method of claim 2, further comprising:

before determining that the first one-frame video image includes the smart device corresponding to the second feature vector, displaying identity confirmation information of the smart device, wherein the identity confirmation information of the smart device includes a device identification of the smart device corresponding to the second feature vector; and determining that the first one-frame video image includes the smart device corresponding to the second feature vector when a confirmation command for the identity confirmation information of the smart device is received.

4. The method of claim 3, further comprising:

before determining the plurality of smart devices included in the first one-frame video image, acquiring an image of each smart device of the plurality of smart devices bound to the user account;

performing feature extraction on each of the images of the plurality of smart devices to obtain feature vectors of the plurality of smart devices; and storing the feature vectors of the plurality of smart devices as the second feature vectors.

5. The method of claim 2, further comprising:

before determining plurality of smart devices included in the first one-frame video image, acquiring an image of each smart device of the plurality of smart devices bound to the user account;

performing feature extraction on each of the images of the plurality of smart devices to obtain feature vectors of the plurality of smart devices; and storing the feature vectors of the plurality of smart devices as the second feature vectors.

6. The method of claim 1, further comprising:

before determining the plurality of smart devices included in the first one-frame video image, acquiring an image of each smart device of the plurality of smart devices bound to the user account;

performing feature extraction on each of the images of the plurality of smart devices to obtain feature vectors of the plurality of smart devices; and storing the feature vectors of the plurality of smart devices as the second feature vectors.

7. The method of claim 1, wherein controlling the smart device located in the target area based on the control operation comprises:

displaying a control interface of the smart device located in the target area, wherein the control interface includes a plurality of control options;

receiving a selection operation that is configured to select one of the control options; and controlling the smart device based on the selected one of the control options.

8. An apparatus for controlling a smart device that is bound to a user account, comprising:

a processor; and a storage configured to store executable instructions executed by the processor;

wherein the processor is configured to:

acquire a video stream captured by a smart camera that is bound to the user account, wherein the video stream includes multi-frame video that includes a plurality of one-frame video images;

perform pattern recognition on each of the plurality of one-frame video images, wherein the pattern recognition is configured to determine an area that includes at least one smart device in at least one of the plurality of one-frame video images;

determine, based on the pattern recognition, a target area that includes the smart device in a first one-frame video image of the plurality of one-frame video images;

display the first one-frame video image including the target area on a touch screen;

detect, via the touch screen, a control operation within the target area of the first one-frame video image; and control the smart device located in the target area based on the control operation, wherein the processor is further configured to:

determine, based on the pattern recognition, a plurality of image areas in the first one-frame video image;

perform feature extraction on each of the plurality of image areas;

obtain a plurality of first feature vectors based on the feature extraction; and
determine a plurality of smart devices included in the first one-frame video image and corresponding ones of the plurality of image areas where each of the smart devices is located based on the plurality of first feature vectors and a plurality of second feature vectors, wherein there is a one-to-one correspondence between the plurality of second feature vectors and a plurality of smart devices bound to the user account.

9. The apparatus of claim 8, wherein the processor is further configured to:
for each second feature vector of the plurality of second feature vectors, determine an Euclidean distance between the second feature vector and each first feature vector of the plurality of first feature vectors, to obtain a plurality of Euclidean distances;
determine that the first one-frame video image includes the smart device corresponding to the second feature vector when a minimum Euclidean distance among the plurality of Euclidean distances is less than a preset distance threshold; and
determine a first image area of the plurality of image areas that is associated with the minimum Euclidian distance as the target area that includes the smart device corresponding to the second feature vector in the first one-frame video image.

10. The apparatus of claim 9, wherein the processor is further configured to:
display identity confirmation information of the smart device, wherein the identity confirmation information of the smart device includes a device identification of the smart device corresponding to the second feature vector; and
determine that the first one-frame video image includes the smart device corresponding to the second feature vector when a confirmation command for the identity confirmation information of the smart device is received.

11. The apparatus of claim 8, wherein the processor is further configured to:
acquire an image of each smart device of the plurality of smart devices bound to the user account;
perform feature extraction one each of the images of the plurality of smart devices to obtain feature vectors of the plurality of smart devices; and
store the feature vectors of the plurality of smart devices as the second feature vectors.

12. The apparatus of claim 8, wherein the processor is further configured to:
display a control interface of the smart device located in the target area, wherein the control interface includes a plurality of control options;
receive a selection operation that is configured to select one of the control options; and
control the smart device based on the selected one of the control options.

13. A non-transitory computer-readable storage medium storing instructions that, when executed by one or more processors of a computing device, cause the computing device to:
acquire a video stream captured by a smart camera that is bound to the user account, wherein the video stream includes multi-frame video that includes a plurality of one-frame video images;
perform pattern recognition on each of the plurality of one-frame video images, wherein the pattern recognition is configured to determine an area that includes at least one smart device in at least one of the plurality of one-frame video images;
determine, based on the pattern recognition, a target area that includes the smart device in a first one-frame video image of the plurality of one-frame video images;
display the first one-frame video image including the target area on a touch screen;
detect, via the touch screen, a control operation within the target area of the first one-frame video image; and
control the smart device located in the target area based on the control operation,
wherein the instructions further cause the computing device to:
determine, based on the pattern recognition, a plurality of image areas in the first one-frame video image;
perform feature extraction on each of the plurality of image areas;
obtain a plurality of first feature vectors based on the feature extraction; and
determine a plurality of smart devices included in the first one-frame video image and corresponding ones of the plurality of image areas where each of the smart devices is located based on the plurality of first feature vectors and a plurality of second feature vectors, wherein there is a one-to-one correspondence between the plurality of second feature vectors and a plurality of smart devices bound to the user account.

14. The non-transitory computer-readable storage medium of claim 13, wherein the instructions cause the computing device to:
for each second feature vector of the plurality of second feature vectors, determine an Euclidean distance between the second feature vector and each first feature vector of the plurality of first feature vectors, to obtain a plurality of Euclidean distances;
determine that the first one-frame video image includes the smart device corresponding to the second feature vector when a minimum Euclidean distance among the plurality of Euclidean distances is less than a preset distance threshold; and
determine a first image area of the plurality of image areas that is associated with the minimum Euclidean distance as the target area that includes the smart device corresponding to the second feature vector in the first one-frame video image.

15. The non-transitory computer-readable storage medium of claim 14, wherein the instructions cause the computing device to:
display identity confirmation information of the smart device, wherein the identity confirmation information of the smart device includes a device identification of the smart device corresponding to the second feature vector; and
determine that the first one-frame video image includes the smart device corresponding to the second feature vector when a confirmation command for the identity confirmation information of the smart device is received.

16. The non-transitory computer-readable storage medium of claim 13, wherein the instructions cause the computing device to:
acquire an image of each smart device of the plurality of smart devices bound to the user account;

perform feature extraction one each of the images of the plurality of smart devices to obtain feature vectors of the plurality of smart devices; and store the feature vectors of the plurality of smart devices as the second feature vectors.

17. The non-transitory computer-readable storage medium of claim 13, wherein the instructions cause the computing device to:

display a control interface of the smart device located in the target area, wherein the control interface includes a plurality of control options;

receive a selection operation that is configured to select one of the control options; and control the smart device based on the selected one of the control options.

* * * * *